US009662635B2

(12) United States Patent
Rahman et al.

(10) Patent No.: US 9,662,635 B2
(45) Date of Patent: May 30, 2017

(54) CATALYTIC COMPOSITION FOR THE ELECTROCHEMICAL REDUCTION OF CARBON DIOXIDE

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Saleem Ur Rahman, Dhahran (SA); Shakeel Ahmed, Dhahran (SA); Mohammad Mozahar Hossain, Dhahran (SA); Shahid Muhammad Bashir, Riyadh (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/539,337

(22) Filed: Nov. 12, 2014

(65) Prior Publication Data

US 2015/0072853 A1    Mar. 12, 2015

Related U.S. Application Data

(62) Division of application No. 13/727,515, filed on Dec. 26, 2012, now abandoned.

(51) Int. Cl.
*B01J 37/34* (2006.01)
*B01J 23/14* (2006.01)
(Continued)

(52) U.S. Cl.
CPC ............. *B01J 23/14* (2013.01); *B01J 23/755* (2013.01); *B01J 37/0201* (2013.01);
(Continued)

(58) Field of Classification Search
CPC ........ B01J 21/185; B01J 23/755; B01J 37/08; B01J 37/34; B01J 37/343; B01J 37/0201; B01J 37/0213; C25B 11/0452
(Continued)

(56) References Cited

U.S. PATENT DOCUMENTS 9,099,752 B2 *   8/2015   Rahman .................. C25B 11/04
9,109,293 B2 *   8/2015   Rahman .................. C25B 11/04
(Continued)

FOREIGN PATENT DOCUMENTS

CN        10-2275864      * 12/2011    ............... B81C 1/00
EP         2463233 A1       6/2012

OTHER PUBLICATIONS

"Hydrogen production by low-temperature reforming of organic compounds in bio-oil over a CNT-promoting Ni catalyst," Tao Hou et al. International Journal of Hydrogen Energy 34 (2009), pp. 9095-9107.*
(Continued)

*Primary Examiner* — Patricia L Hailey
(74) *Attorney, Agent, or Firm* — Richard C. Litman

(57) ABSTRACT

The catalytic composition for the electrochemical reduction of carbon dioxide is a metal oxide supported by multi-walled carbon nanotubes. The metal oxide may be nickel oxide (NiO) or tin dioxide ($SnO_2$). The metal oxides form 20 wt % of the catalyst. In order to make the catalysts, a metal oxide precursor is first dissolved in deionized water to form a metal oxide precursor solution. The metal oxide precursor solution is then sonicated and the solution is impregnated in a support material composed of multi-walled carbon nanotubes to form a slurry. The slurry is then sonicated to form a homogeneous solid solution. Solids are removed from the homogeneous solid solution and dried in an oven for about 24 hours at a temperature of about 110° C. Drying is then
(Continued)

followed by calcination in a tubular furnace under an argon atmosphere for about three hours at a temperature of 450° C.

4 Claims, 7 Drawing Sheets

(51) Int. Cl.
*B01J 23/755* (2006.01)
*C25B 11/04* (2006.01)
*B01J 37/02* (2006.01)
*B01J 37/08* (2006.01)

(52) U.S. Cl.
CPC .......... *B01J 37/0213* (2013.01); *B01J 37/08* (2013.01); *B01J 37/341* (2013.01); *C25B 11/0452* (2013.01)

(58) Field of Classification Search
USPC ...................... 502/5, 337; 977/752
See application file for complete search history.

(56) References Cited

U.S. PATENT DOCUMENTS

| | | | |
|---|---|---|---|
| 9,333,487 B2* | 5/2016 | Rahman | B01J 23/755 |
| 2009/0017375 A1* | 1/2009 | Takezawa | H01M 4/587 |
| | | | 429/207 |
| 2009/0033196 A1* | 2/2009 | Cho | H01J 1/304 |
| | | | 313/309 |
| 2010/0187123 A1 | 7/2010 | Bocarsly et al. | |
| 2010/0213046 A1 | 8/2010 | Grimes et al. | |
| 2010/0258446 A1 | 10/2010 | Mohapatra et al. | |
| 2012/0149554 A1 | 6/2012 | Lin et al. | |

OTHER PUBLICATIONS

"Large scale synthesis of nickel oxide/multiwalled carbon nanotube composites by direct thermal decomposition and their lithium storage properties," Chaohe Xu et al. Journal of Power Sources 196 (2011), pp. 5138-5142.*

Wei-Qiang Han and A. Zettl, "Coating Single-Walled Carbon Nanotubes with Tin Oxide", *Nano Letters,* 2003, 3 (5), pp 681-683.

Ji Yeong Lee, Kui Liang, Kay Hyeok An and Young Hee Lee, "Nickel oxide/carbon nanotubes nanocomposite for electrochemical capacitance", *Synthetic Materials,* vol. 150, Issue 2, Apr. 30, 2005, pp. 153-157.

Prior Art Provided in Parent U.S. Appl. No. 13/727,515, filed Dec. 26, 2012, The Priority of Which is Claimed.

* cited by examiner

CATALYTIC COMPOSITION FOR THE ELECTROCHEMICAL REDUCTION OF CARBON DIOXIDE

CROSS-REFERENCE TO RELATED APPLICATIONS

This application is a divisional application of U.S. patent application Ser. No. 13/727,515, filed on Dec. 26, 2012, presently pending.

BACKGROUND OF THE INVENTION

1. Field of the Invention

The present invention relates to catalytic coatings for electrodes for the electrochemical reduction of carbon dioxide, and particularly to a catalytic composition for the electrochemical reduction of carbon dioxide that provides metal oxide catalysts for performing the reduction of carbon dioxide, where the metal oxides are supported by multi-walled carbon nanotubes.

2. Description of the Related Art

Carbon dioxide is the fourth most abundant gas in the atmosphere. It is naturally available in our atmosphere, but in the last few decades there has been a gradual increase in the concentration of atmospheric carbon dioxide. The primary reason for the rapid growth of carbon dioxide gas concentration results from the combustion of fossils fuels for power generation, along with vehicle exhaust and emissions from industrial plants. Due to a high population growth rate and the dependency of the human race on fossil fuels, the release of carbon dioxide into the environment is an ever-growing concern, particularly as carbon dioxide is considered a major factor in the greenhouse effect and global climate change.

The first step of $CO_2$ minimization is the separation and capture of $CO_2$ from fossil fuel combustion sources. Conventionally, $CO_2$ capture is implemented by the absorption of $CO_2$ using strong $CO_2$ absorbing agents, such as amines. However, the financial cost of using such processes is very high. Due to the cost-prohibitive nature of such conventional carbon dioxide capture systems, other technologies are presently being explored, such as radiochemical methods, thermo-chemical processes, photochemical and biochemical methods, and also electrochemical methods. Among these various processes, electrochemical carbon dioxide reduction is of the greatest interest due to its relative potential ease of implementation.

Thus far, however, an efficient electrochemical process for the reduction of carbon dioxide has not been found, particularly due to the exotic and costly nature of electrolytic catalyst materials, such as solid polymer electrolyte membranes. It would be desirable to provide a relatively low cost and easy to manufacture electrochemical catalytic compound for the reduction of carbon dioxide.

Thus, a catalytic composition for the electrochemical reduction of carbon dioxide solving the aforementioned problems is desired.

SUMMARY OF THE INVENTION

The catalytic composition for the electrochemical reduction of carbon dioxide relates to metal oxide catalysts for performing the reduction of carbon dioxide, where the metal oxides are supported by multi-walled carbon nanotubes. Nickel oxide (NiO) supported on multi-walled carbon nanotubes (NiO/MWCNT) and tin dioxide ($SnO_2$) supported on multi-walled carbon nanotubes ($SnO_2$/MWCNT) are used. The metal oxides form 20 wt % of the catalyst.

In order to make the catalysts, a metal oxide precursor is first dissolved in deionized water to form a metal oxide precursor solution. The metal oxide precursor solution is then sonicated for a few minutes, and the solution is impregnated in a support material composed of multi-walled carbon nanotubes to form a slurry. The slurry is then sonicated for about two hours to form a homogeneous solid solution. Solids are removed from the homogeneous solid solution and dried in an oven for about 24 hours at a temperature of about 110° C. Drying is then followed by calcination in a tubular furnace in an argon atmosphere for about three hours at a temperature of 450° C. in order to decompose any nitrates in the samples.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The catalytic composition for the electrochemical reduction of carbon dioxide relates to the electrochemical reduction of carbon dioxide, and particularly to metal oxide catalysts for performing the reduction of carbon dioxide, where the catalysts are metal oxides supported by multi-walled carbon nanotubes. Nickel oxide (NiO) supported on multi-walled carbon nanotubes and tin dioxide ($SnO_2$) supported on multi-walled carbon nanotubes are used. The metal oxides form 20 wt % of the catalyst.

In order to make the catalysts, a metal oxide precursor is first dissolved in deionized water to form a metal oxide precursor solution. The metal oxide precursor solution is then sonicated for a few minutes, and the solution is impregnated in a support material composed of multi-walled carbon nanotubes to form a slurry. The slurry is then sonicated for about two hours to form a homogeneous solid solution. Solids are removed from the homogeneous solid solution and dried in an oven for about 24 hours at a temperature of about 110° C. Drying is then followed by calcination in a tubular furnace in an argon atmosphere for about three hours at a temperature of 450° C. in order to decompose any nitrates in the samples.

The metal oxide precursor for NiO supported on multi-walled carbon nanotubes (NiO/MWCNT) is preferably nickel nitrate hexahydrate, $Ni(NO_3)_2 \cdot 6H_2O$. The metal oxide precursor for $SnO_2$ supported on multi-walled carbon nanotubes ($SnO_2$/MWCNT) is preferably tin chloride, $SnCl_2$. In the preparation of $SnO_2$/MWCNT, following the sonication of the metal oxide precursor solution, a small drop of hydrochloric acid (HCl) is preferably added, ensuring the impregnation of stannic oxide or tin dioxide ($SnO_2$) on the multi-walled carbon nanotube support material, rather than stannous oxide or tin oxide (SnO).

Figure 1:
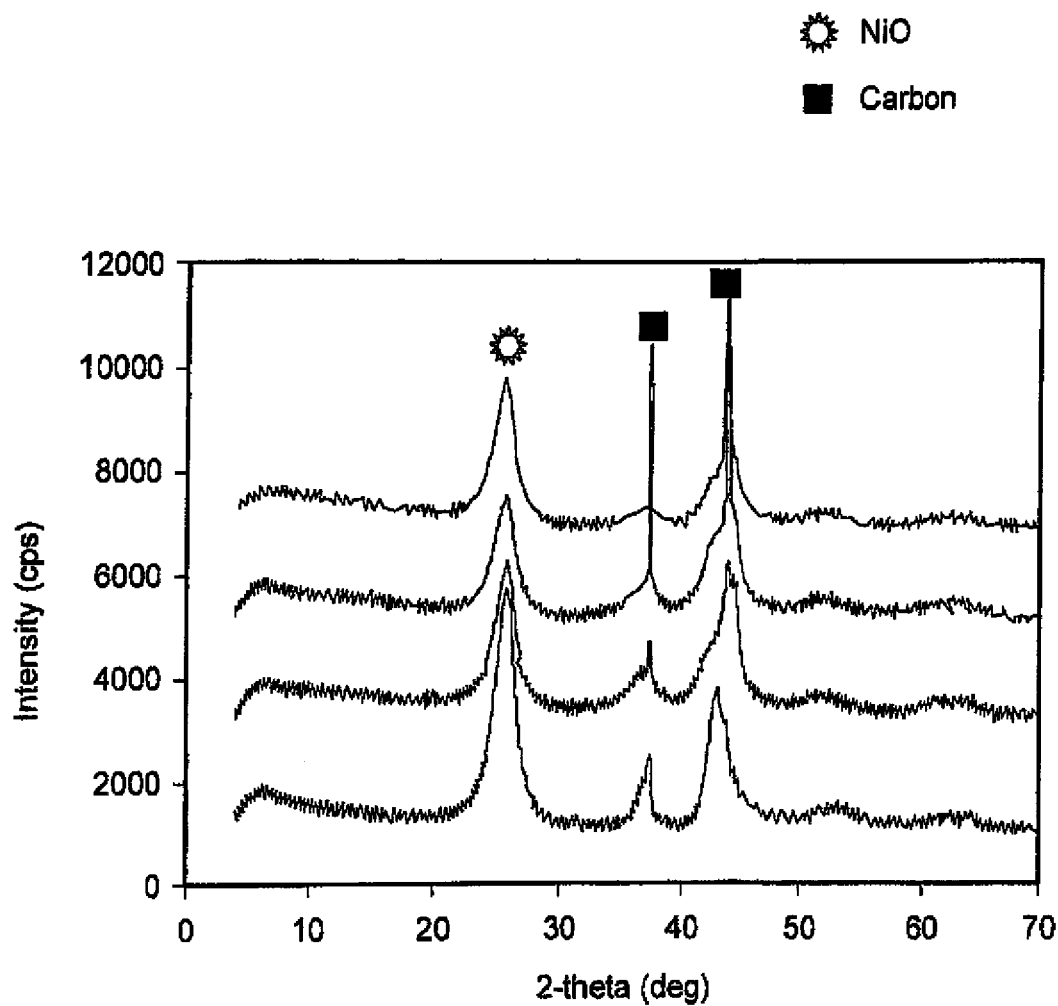
FIG. 1 is an X-ray diffraction (XRD) plot of NiO/MWCNT samples having NiO loadings of 10 wt %, 20 wt %, 30 wt % and 40 wt %.
Figure 2:
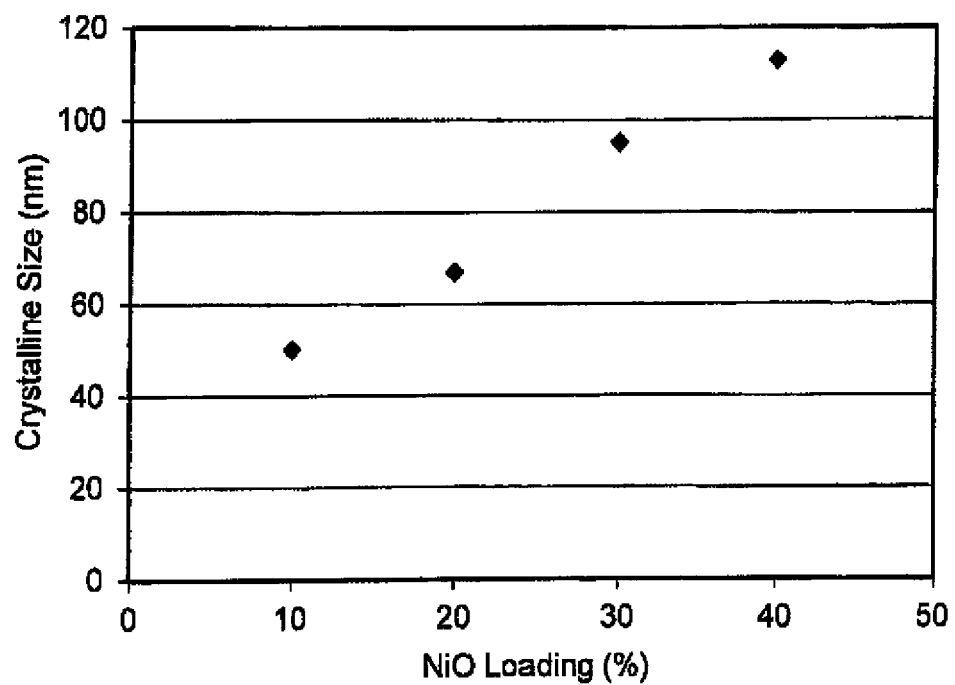
FIG. 2 is a graph of predicted crystal sizes for the NiO/MWCNT samples of FIG. 1, the crystal sizes being calculated using Scherrer's equation.

FIG. 1 illustrates X-ray diffraction (XRD) patterns of different NiO/MWCNT catalysts synthesized with varying NiO loadings. It can be seen that all of the catalyst samples show similar XRD patterns, which indicates the presence of the same metal oxide phases at different metal loading of the catalysts. The first peak at 26° corresponds to carbon, while the other two peaks at 37° and 43° are NiO (111) and NiO (200), respectively. Further, the height of the first peak is increased with increased nickel loading on the MWCNT support material. This is an indication of larger nickel crystal size at higher metal loadings. In order to confirm this, the NiO crystalline size was calculated using Scherrer's equation, as shown in FIG. 2. As shown, the nickel oxide crystallites become larger at higher loadings of NiO, resulting in poor dispersion. This was also seen in scanning electron microscope (SEM) analysis of the prepared samples.

Figure 3:
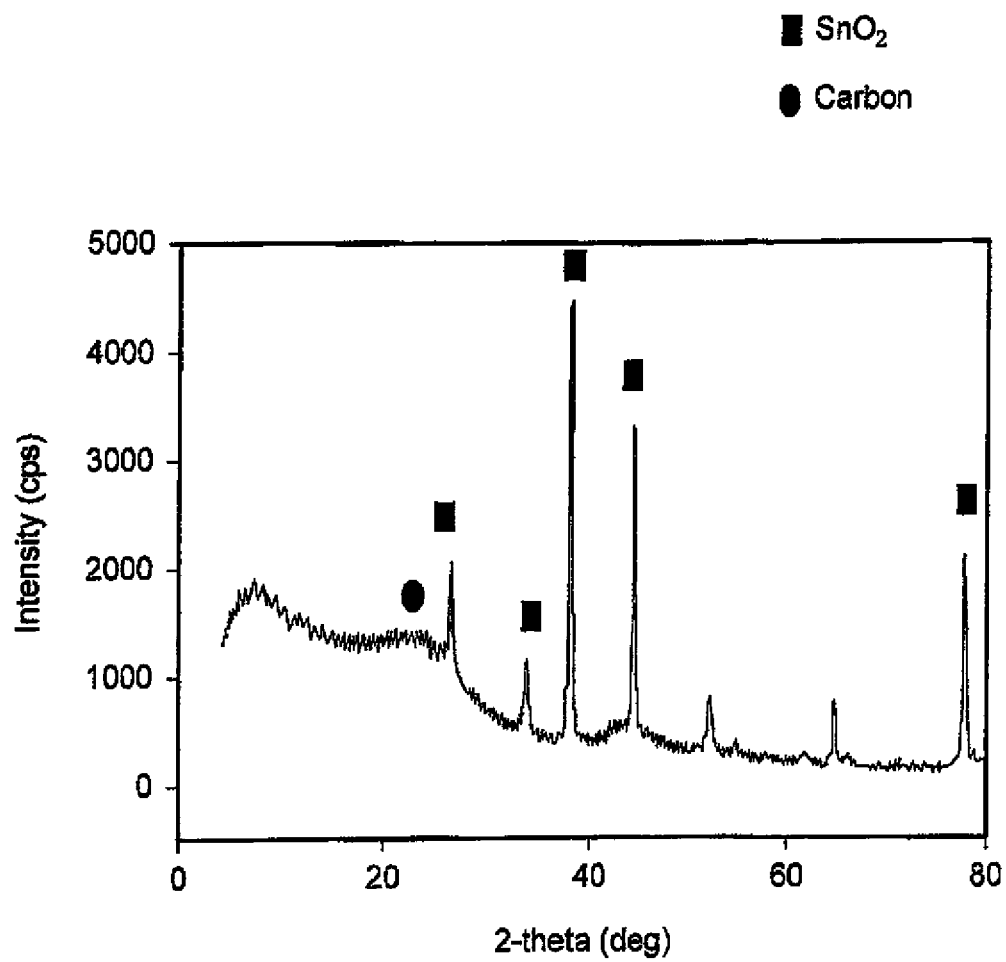
FIG. 3 is an X-ray diffraction (XRD) plot of a $SnO_2$/MWCNT sample having a $SnO_2$ loading of 20 wt %.

FIG. 3 illustrates XRD analysis of the $SnO_2$/MWCNT catalyst for $SnO_2$ loading of 20 wt %. Different crystalline phases of the $SnO_2$/MWCNT catalyst were obtained. As shown, the $SnO_2$ phase of (110) at a 2θ angle of 26.63° overlaps with the carbon peak (002). Additionally, several other peaks of $SnO_2$ are observed at 2θ angles of 33.90°, 38.23°, 42.80°, 51.77°, 54.67°, 64.59° and 78.73°. Similar to the above, the $SnO_2$ crystal size was also calculated using Scheme s equation, resulting in a crystal size of 31.5 nm, which corresponds to the peak having the highest intensity.

SEM results for the NiO/MWCNT samples were consistent with the corresponding XRD plots. As the metal oxide content was increased, the crystalline size was seen to increase. This resulted in a decrease in dispersion. SEM was carried out with a magnification of 16,000× at a 1 μm scale. Quantitative analysis of the NiO/MWCNT samples was also carried out using energy-dispersive X-ray spectroscopy (EDX) coupled with the SEM. Tables 1 and 2 below show the results for NiO/MWCNT samples having NiO loadings of 20 wt % and 40 wt %, respectively. The results of Table 1 have an error of an estimated error within 5.123% and the results of Table 2 have an estimated error within 6.04%.

TABLE 1

Elemental Analysis of 20 wt % NiO/MWCNT Sample

| Element | Weight Percent |
| --- | --- |
| C | 81.1 |
| O | 4.87 |
| Ni | 14.02 |
| Total | ~100 |

TABLE 2

Elemental Analysis of 40 wt % NiO/MWCNT Sample

| Element | Weight Percent |
| --- | --- |
| C | 62.9 |
| O | 8.27 |
| Ni | 28.83 |
| Total | ~100 |

SEM was similarly performed on the $SnO_2$/MWCNT catalyst sample with 20 wt % loading of the $SnO_2$. The $SnO_2$ was found to be uniformly dispersed within the carbon nanotube matrix.

The catalysts were used to make electrodes by pasting a slurry of the catalysts with a Nafion® binder onto carbon paper in layers and drying the paste at about 100° C., as known in the art. The metal oxide/MWCNT coated electrodes were as cathodes in the electrochemical reduction of carbon dioxide. The electrodes were first tested by Linear Sweep Voltammetry (LSV) using 0.5M $NaHCO_3$ solution saturated with $CO_2$ as the electrolyte.

Figure 4:
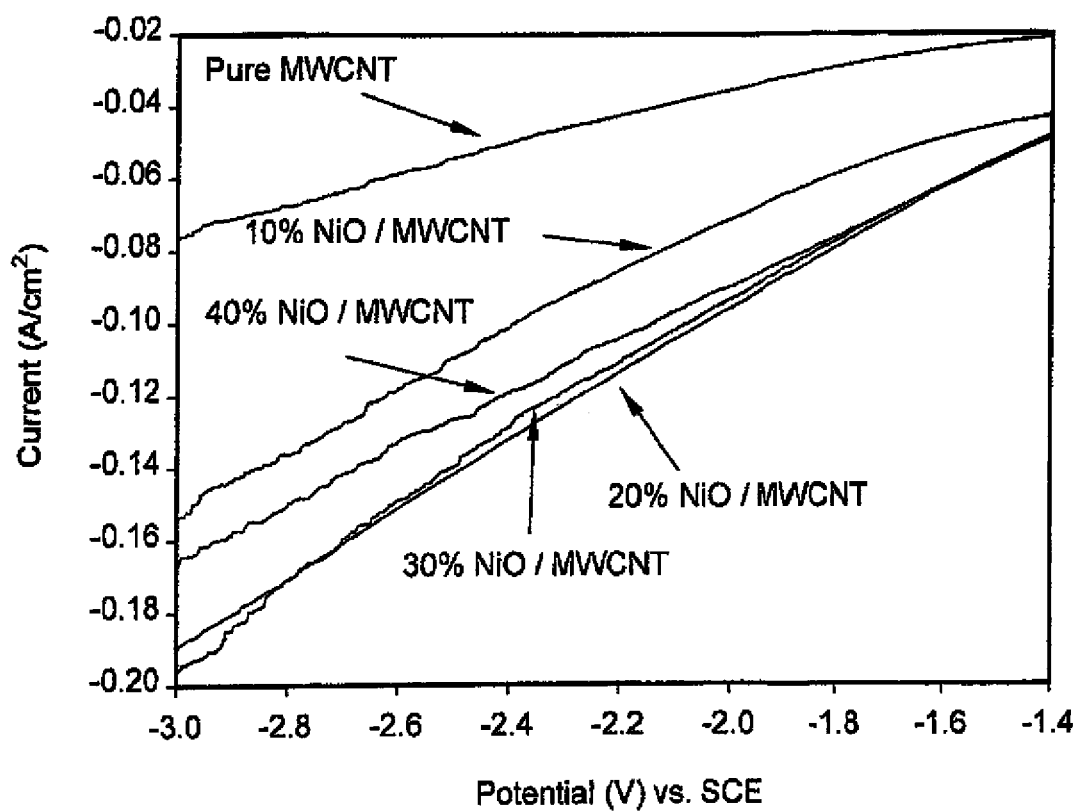
FIG. 4 is a graph illustrating linear sweep voltammetry curves for carbon dioxide reduction using the NiO/MWCNT catalyst samples of FIG. 1.
Figure 5:
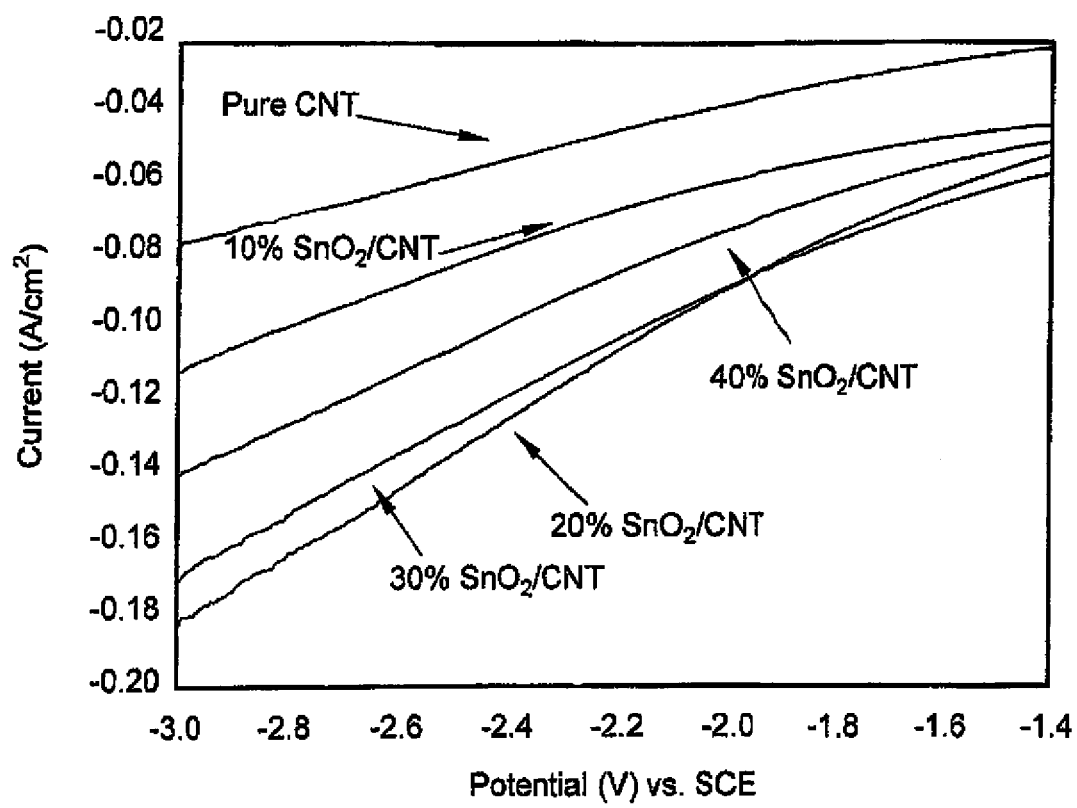
FIG. 5 is a graph illustrating linear sweep voltammetry curves for carbon dioxide reduction using $SnO_2$/MWCNT catalyst samples having $SnO_2$ loadings of 10 wt %, 20 wt %, 30 wt % and 40 wt %.

FIGS. 4 and 5 illustrate linear sweep voltammetry (LSV) curves for carbon dioxide reduction using NiO/MWCNT and $SnO_2$/MWCNT catalyst samples, respectively, used as electrodes for electrochemical reduction of the carbon dioxide with metal oxide loadings of 10 wt %, 20 wt %, 30 wt % and 40 wt %. The NiO/MWCNT and $SnO_2$/MWCNT samples, with various metal oxide loadings, were evaluated using a saturated $CO_2$ solution. The optimal NiO and $SnO_2$ loadings for the reduction of $CO_2$ in an electrochemical cell were obtained using LSV experiments. The parameter used to find the optimal catalyst was current density, since current density for electro-catalytic reactions is an indicator of rate of reaction. For all catalysts, the reduction of carbon dioxide was assumed to be greater at higher voltages.

It can be seen in FIG. 4 that the optimal loading of NiO is found to be 20 wt % at different voltages vs. a saturated calomel electrode (SCE). The optimal parameter is the total amount of current produced. The catalyst with 30 wt % NiO shows a slight increase in current measurement to that obtained using the 20 wt % NiO loaded catalyst. The increase of NiO to 40 wt % shows a decrease in the current. This observation is consistent with the catalyst characterization results described above. As seen in the XRD analysis, the crystalline size of NiO particles was increased with the increase of the NiO content. Therefore, the larger NiO crystals behave like bulk metal, and the surface area available for the reaction starts decreasing, thus decreasing the reaction rate compared to the 20 wt % NiO content. This was further seen in the SEM analysis, where the dispersion of the NiO particles on MWCNT was poor in the cases of higher loading, and where the sizes of the particles were very large. Overall the 20 wt % NiO loaded samples were found to be best for the reduction of carbon dioxide. Similar analysis was carried out with $SnO_2$/MWCNT catalyst samples, as shown in FIG. 5. The optimal loading of $SnO_2$ was found to be 20 wt %, the analysis being similar to that given above for NiO.

Figure 6:
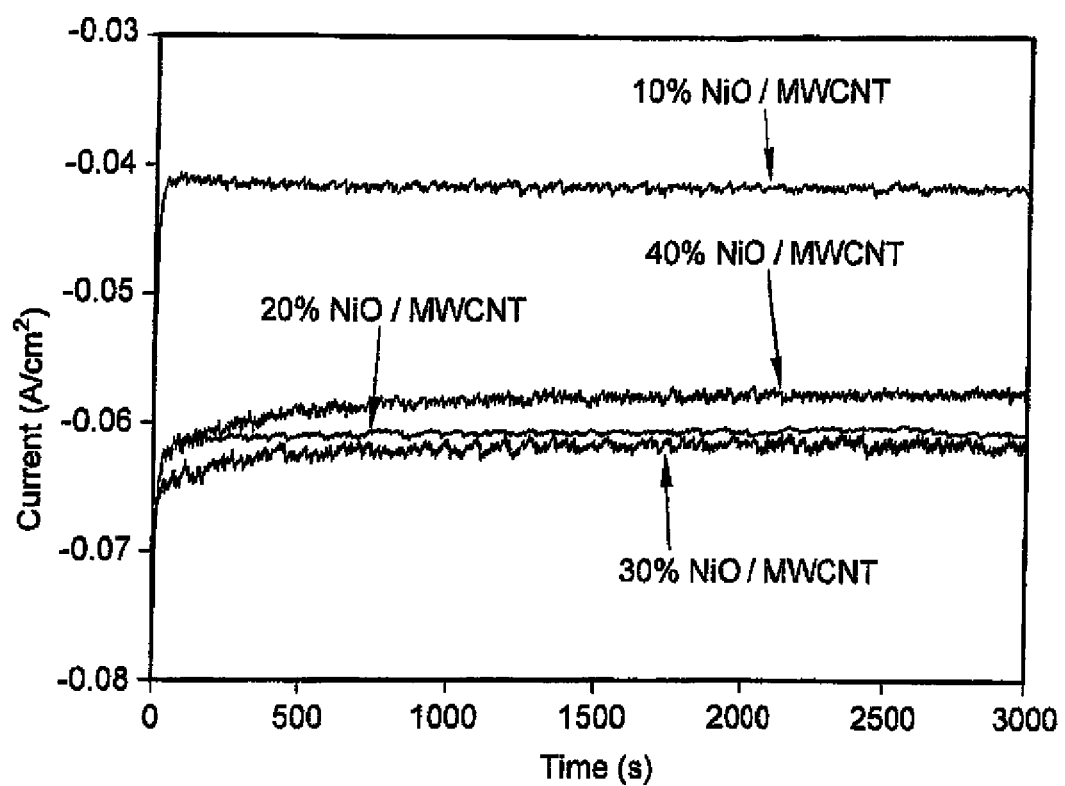
FIG. 6 is a graph showing chronoamperometry results for the NiO/MWCNT catalyst samples of FIG. 1.
Figure 7:
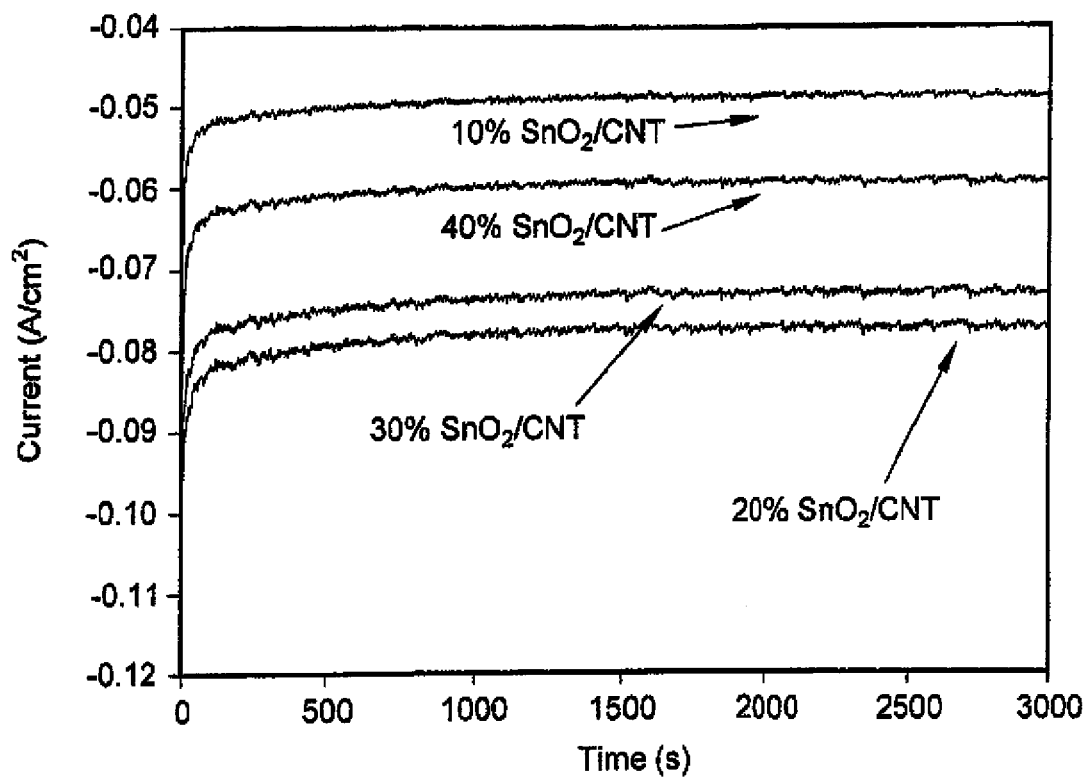
FIG. 7 is a graph showing chronoamperometry results for the $SnO_2$/MWCNT catalyst samples of FIG. 5.

In addition to the XRD and LSV analysis, FIG. 6 shows the results of chronoamperometry analysis for NiO/MWCNT catalyst samples with NiO loadings of 10 wt %, 20 wt %, 30 wt % and 40 wt %. Chronoamperometry was performed because it provides a more reliable and long term analysis than LSV. It is a steady state analysis that shows the actual current calculation for the series of catalysts over a long period of time. For present purposes, the current response was observed for 3000 seconds at a voltage of −1.7V vs. a SCE reference electrode. The −1.7V potential was selected given the objective of reducing the carbon dioxide at the minimum possible applied voltage (higher voltage, while being more favorable for the reduction of carbon dioxide, also leads to the evolution of more hydrogen). The chronoamperometry was also performed using a 0.5M $NaHCO_3$ solution saturated with $CO_2$ as the electrolyte. Similarly, FIG. 7 shows the results of chronoamperometry analysis for $SnO_2$/MWCNT catalyst samples with $SnO_2$ loadings of 10 wt %, 20 wt %, 30 wt % and 40 wt %. Similar to the above, the optimal catalysts for carbon dioxide reduction are found have 20 wt % metal oxides. Research for the above was funded by the National Plan for Science, Technology and Innovation (MAARIFAH), located in King Abdulaziz City for Science and Technology, Kingdom of Saudi Arabia, award number 08-ENE54-04.

It is to be understood that the present invention is not limited to the embodiments described above, but encompasses any and all embodiments within the scope of the following claims.

We claim:

1. A method of making a catalytic composition for the electrochemical reduction of carbon dioxide, comprising the steps of:

dissolving nickel nitrate hexahydrate, $Ni(NO_3)_2 \cdot 6H_2O$, in deionized water to form a nickel precursor solution;

sonicating the nickel precursor solution;

impregnating the sonicated nickel precursor solution in a support material comprising multi-walled carbon nanotubes to form a slurry;

sonicating the slurry to form a homogenous solid solution;

removing solids from the homogenous solid solution;

drying the solids; and calcining the dried solids in an argon atmosphere to form the catalytic composition.

2. The method of making a catalytic composition for the electrochemical reduction of carbon dioxide as recited in claim 1, wherein the step of sonicating the slurry comprises sonicating the slurry for about two hours.

3. The method of making a catalytic composition for the electrochemical reduction of carbon dioxide as recited in claim 1, wherein the step of drying the solids comprises drying the solids at a temperature of about 110° C. for a period of about 24 hours.

4. The method of making a catalytic composition for the electrochemical reduction of carbon dioxide as recited in claim 1, wherein the step of calcining the dried solids comprises calcining the dried solids for about three hours at a temperature of about 450° C.

* * * * *